United States Patent
Qiu

(10) Patent No.: US 12,157,334 B2
(45) Date of Patent: Dec. 3, 2024

(54) CASTER WHEEL BRACKET, CASTER AND MOVABLE CONTAINER

(71) Applicant: Zhangzhou Yalisi Smart Home Co, Ltd., Zhangzhou (CN)

(72) Inventor: Jinrong Qiu, Zhangzhou (CN)

( * ) Notice: Subject to any disclaimer, the term of this patent is extended or adjusted under 35 U.S.C. 154(b) by 333 days.

(21) Appl. No.: 17/875,420

(22) Filed: Jul. 28, 2022

(65) Prior Publication Data

US 2024/0034093 A1    Feb. 1, 2024

(51) Int. Cl.
*B60B 33/00* (2006.01)
*B62B 3/00* (2006.01)

(52) U.S. Cl.
CPC ........ *B60B 33/0023* (2013.01); *B60B 33/001* (2013.01); *B60B 33/0018* (2013.01); *B62B 3/002* (2013.01); *B60B 33/0049* (2013.01); *B60B 2360/32* (2013.01)

(58) Field of Classification Search
CPC .............. B60B 33/0023; B60B 33/001; B60B 33/0018; B60B 33/0049; B60B 33/0015; B60B 33/0005; B60B 33/0002; B62B 3/002; B62B 3/007
See application file for complete search history.

(56) References Cited

U.S. PATENT DOCUMENTS

| | | | | |
|---|---|---|---|---|
| 4,227,281 A * | 10/1980 | Chung | ................ | B60B 33/0002 16/29 |
| 5,934,639 A * | 8/1999 | Chiang | .................. | A47B 91/00 248/346.11 |
| 6,899,345 B1 * | 5/2005 | Bearden | .............. | B60B 33/0057 280/43 |
| 8,302,256 B1 * | 11/2012 | Spraley | ............... | B60B 33/0018 16/30 |

FOREIGN PATENT DOCUMENTS

DE           10158614 A1 *  7/2002   ......... B60B 33/0002

* cited by examiner

*Primary Examiner* — John D Walters

(57) ABSTRACT

A caster wheel bracket, a caster and a movable container are disclosed. The movable container includes a frame and a caster. The caster includes a caster wheel bracket and a caster wheel. The caster wheel bracket includes a support plate. A first restricting portion is disposed on an upper surface of the support plate. The first restricting portion is detachably fitted to corresponding two of the transverse rods. A second restricting portion is disposed on one end of the support plate. The second restricting portion is detachably fitted to a corresponding one of the longitudinal rods. A mounting portion is connected to a lower surface of the support plate for mounting a caster wheel. The caster can be mounted and dismounted quickly and the position of the caster can be adjusted according to the actual needs.

18 Claims, 7 Drawing Sheets

CASTER WHEEL BRACKET, CASTER AND MOVABLE CONTAINER

BACKGROUND OF THE INVENTION

1. Field of the Invention

The present invention relates to a caster, and more particularly to a caster wheel bracket, a caster and a movable container.

2. Description of the Prior Art

In general, the bottom of existing furniture, such as bedside cabinets, file cabinets, drawer cabinets, racks, etc., is equipped with casters for the furniture to be moved with ease, so that the user can quickly move the furniture by pushing.

The casters are detachably connected to the furniture through bolts/screws, or are fixedly connected to the furniture by welding to from an integrated structure. Both of which have certain disadvantages. The disassembly and assembly of the former is troublesome, time-consuming and labor-intensive. The mounting position of the caster is immovable and cannot be adjusted according to actual needs. Because the latter is integrally connected, once the caster is damaged, especially the damage of the caster wheel bracket, it cannot be replaced with a new one. Therefore, strict requirements for the strength and service life of casters are necessary in production, resulting in higher production costs.

SUMMARY OF THE INVENTION

The primary object of the present invention is to provide a caster wheel bracket, a caster and a movable container. The caster can be mounted and dismounted quickly, and the position of the caster can be adjusted according to the actual needs.

In order to achieve the above object, the present invention adopts the following technical solutions:

According to one aspect of the present invention, a caster wheel bracket is provided. The caster wheel bracket is detachably mounted to an underside of a frame. The underside of the frame is formed by a plurality of transverse rods and longitudinal rods that are perpendicularly connected to each other. The caster wheel bracket includes a support plate for supporting the underside of the frame. A first restricting portion is disposed on an upper surface of the support plate. The first restricting portion is detachably fitted to corresponding two of the transverse rods. A second restricting portion is disposed on one end of the support plate. The second restricting portion is detachably fitted to a corresponding one of the longitudinal rods. A mounting portion is connected to a lower surface of the support plate for mounting a caster wheel.

Preferably, the first restricting portion is a protruding structure formed on the upper surface of the support plate. The corresponding two transverse rods of the underside of the frame are clamped on both sides of the first restricting portion in a tight fit manner.

Preferably, the protruding structure includes two flanges protruding from the upper surface of the support plate. The corresponding two transverse rods of the underside of the frame are adjacent or non-adjacent two of the transverse rods and are in tight fit with respective side walls of the two flanges.

Preferably, upper edges of the side walls of the flanges have restricting edges for restricting the corresponding two transverse rods, and the restricting edges extend laterally along the flanges.

Preferably, the second restricting portion is in the form of a clip formed at the end of the support plate. The clip is configured to clamp the corresponding longitudinal rod.

Preferably, the clip includes two upper and lower clip plates, a clip opening defined between the two clip plates for receiving the corresponding longitudinal rod, and arc-shaped restricting grooves on upper and lower surfaces of the clip opening. The corresponding longitudinal rod is movably fitted in the restricting grooves.

Preferably, the mounting portion includes two mounting plates vertically connected to the lower surface of the support plate.

Preferably, the caster wheel bracket is made of a nylon material.

According to another aspect of the present invention, a caster is provided. The caster comprises the foregoing caster wheel bracket and a caster wheel. The caster wheel is rotatably connected to the mounting portion.

According to a further aspect of the present invention, a movable container is provided. The movable container comprises the foregoing caster wheel bracket, a frame, and a caster wheel. The underside of the frame is formed by a plurality of transverse rods and longitudinal rods that are perpendicularly connected to each other. The first restricting portion is detachably fitted to corresponding two of the transverse rods. The second restricting portion is detachably fitted to a corresponding one of the longitudinal rods. The caster wheel is rotatably connected to the mounting portion.

Preferably, the frame includes the underside and a plurality of sides to surround a storage space. Each of the sides of the frame is formed by a plurality of transverse rods/longitudinal rods and vertical rods that are perpendicularly connected to each other.

With the above solutions, in the present invention, the first restricting portion and the second restricting portion of the caster wheel bracket are in tight fit with the transverse rods and the longitudinal rod of the underside of the frame, respectively. The caster wheel bracket can be secured to the frame without using other tools. The disassembly and assembly is fast and easy. Since the underside of the frame is composed of a plurality of transverse rods and longitudinal rods, the caster wheel bracket can be mounted at any position of the underside of the frame as required. The mounting position is more flexible. The support plate of the caster wheel bracket plays a support role for the frame. After an object is placed in the movable container, the stress is shared by the support plate with a plurality of casters to ensure the load-bearing performance of the movable container.

DETAILED DESCRIPTION OF THE PREFERRED EMBODIMENTS

Figure 1:
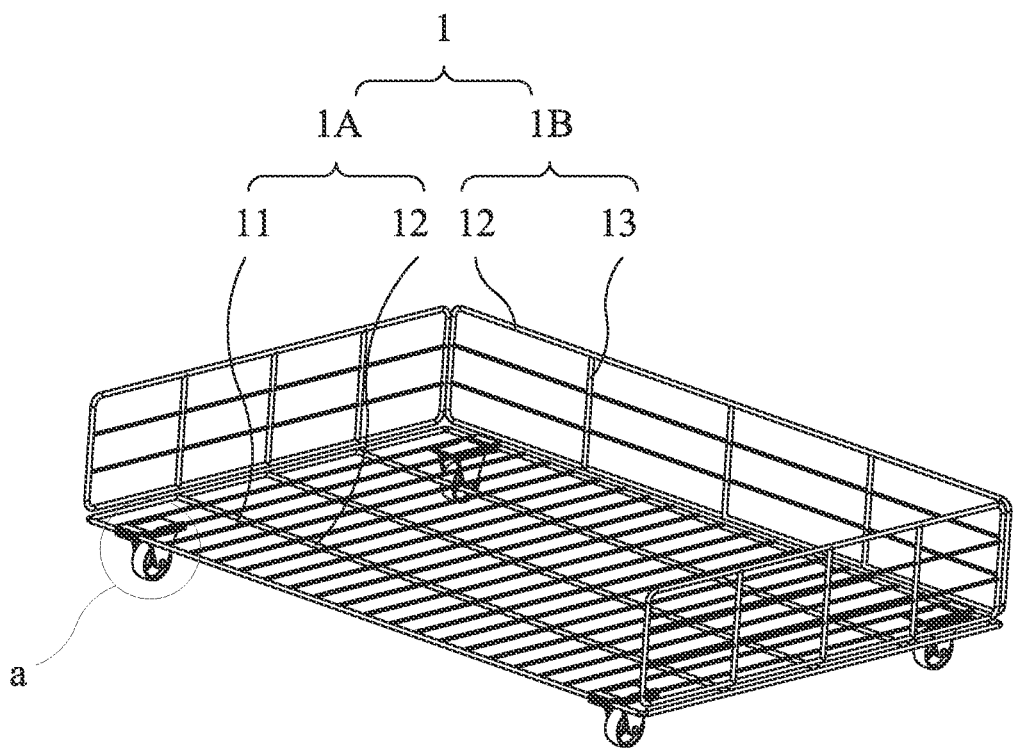
FIG. 1 is a first perspective view of a movable container according to an embodiment of the present invention.
Figure 2:
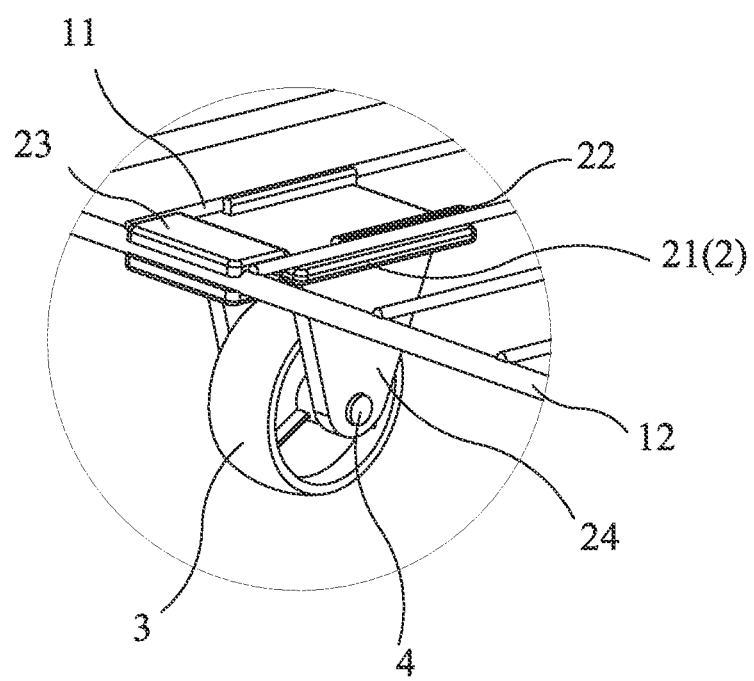
FIG. 2 is an enlarged view of circle a of FIG. 1.
Figure 3:
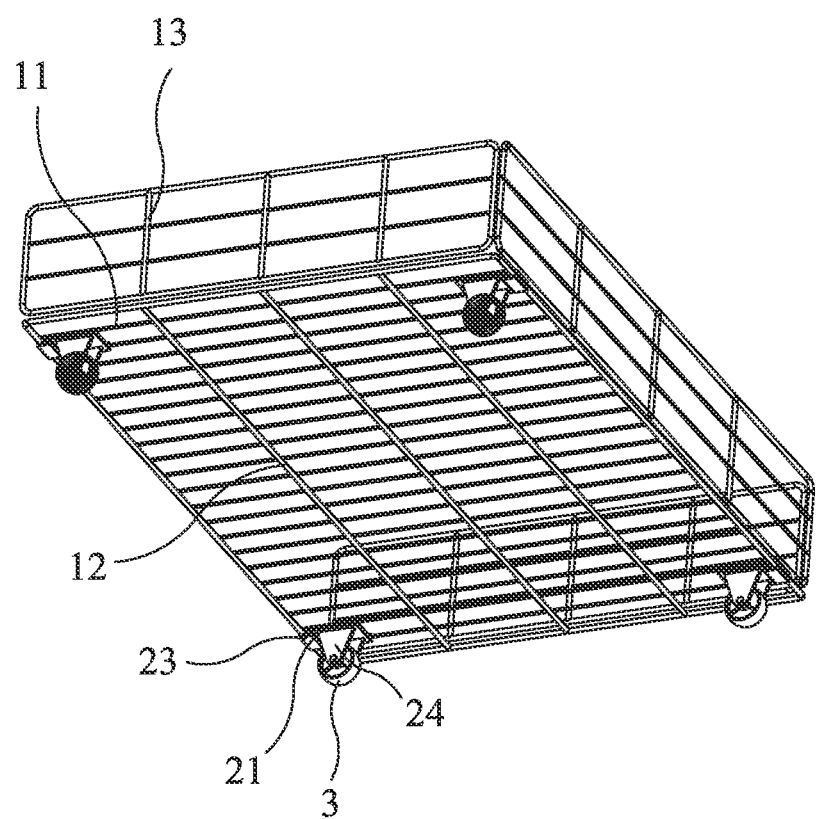
FIG. 3 is a second perspective view of the movable container according to the embodiment of the present invention.
Figure 4:
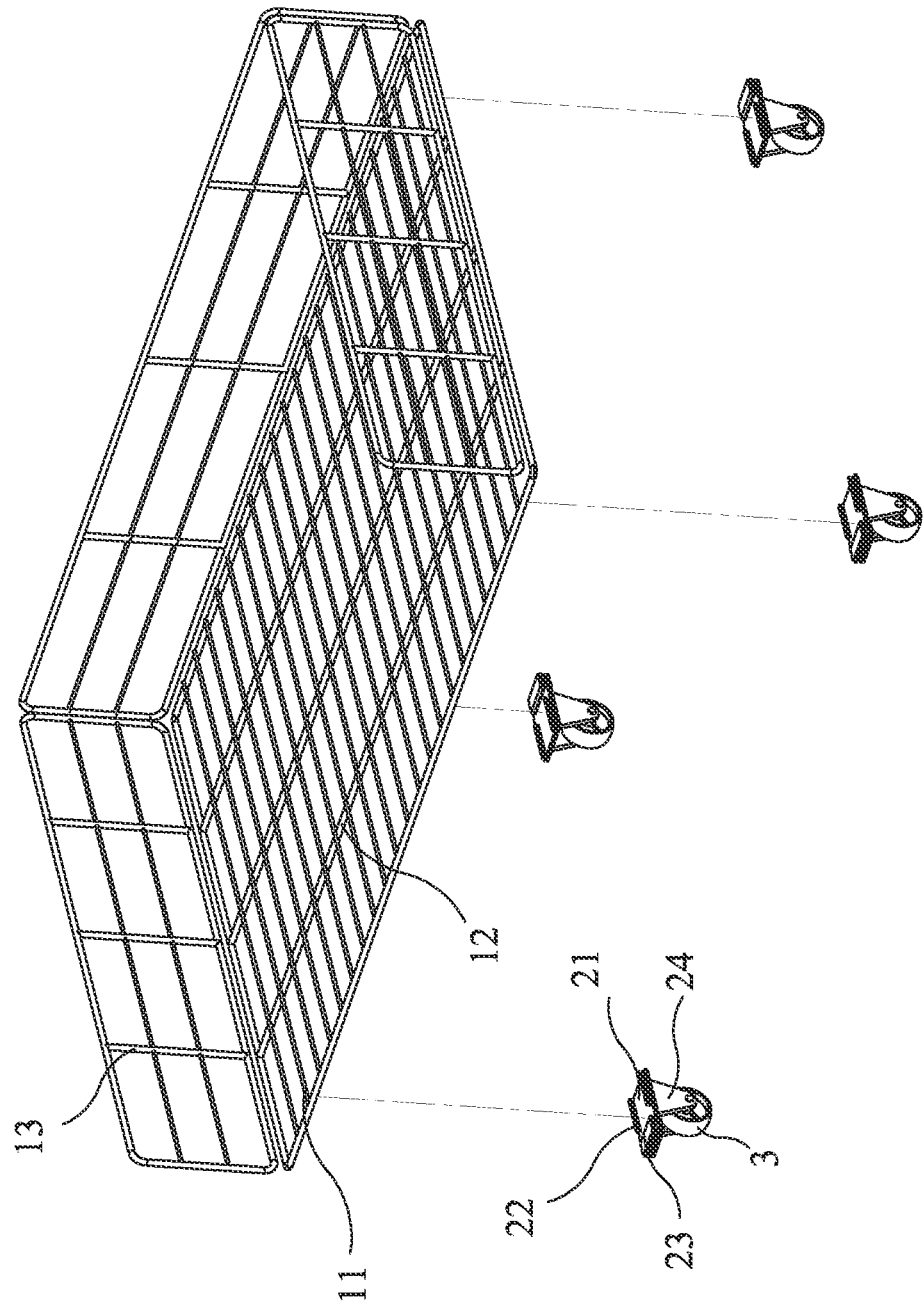
FIG. 4 is an exploded view of the movable container according to the embodiment of the present invention.
Figure 5:
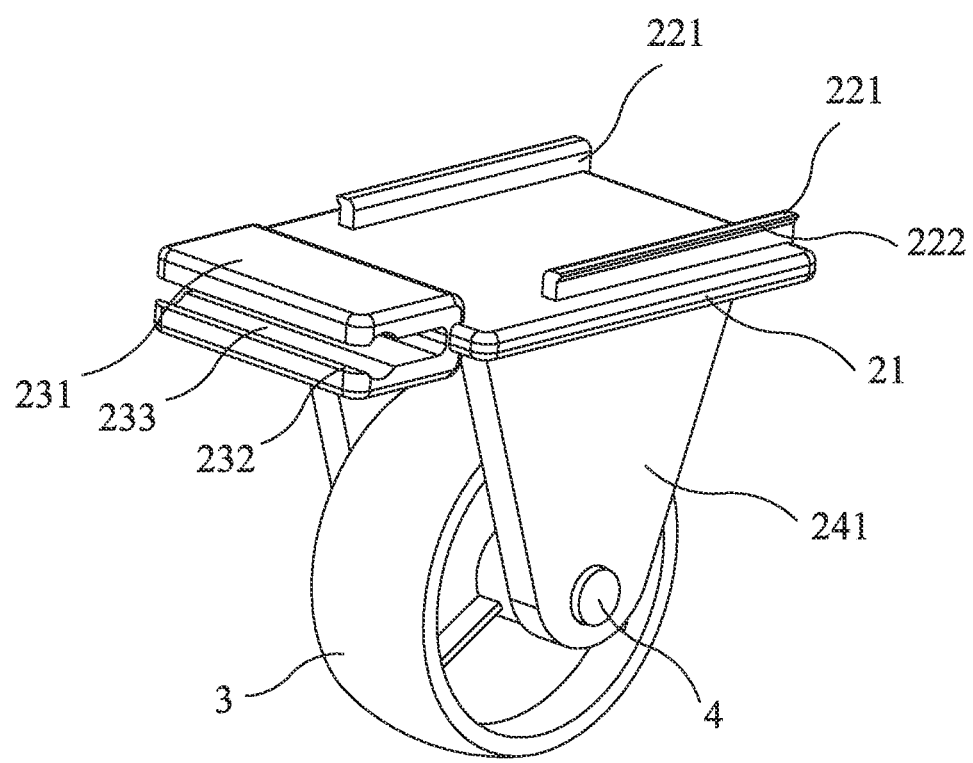
FIG. 5 is a first perspective view of a caster according to an embodiment of the present invention.
Figure 6:
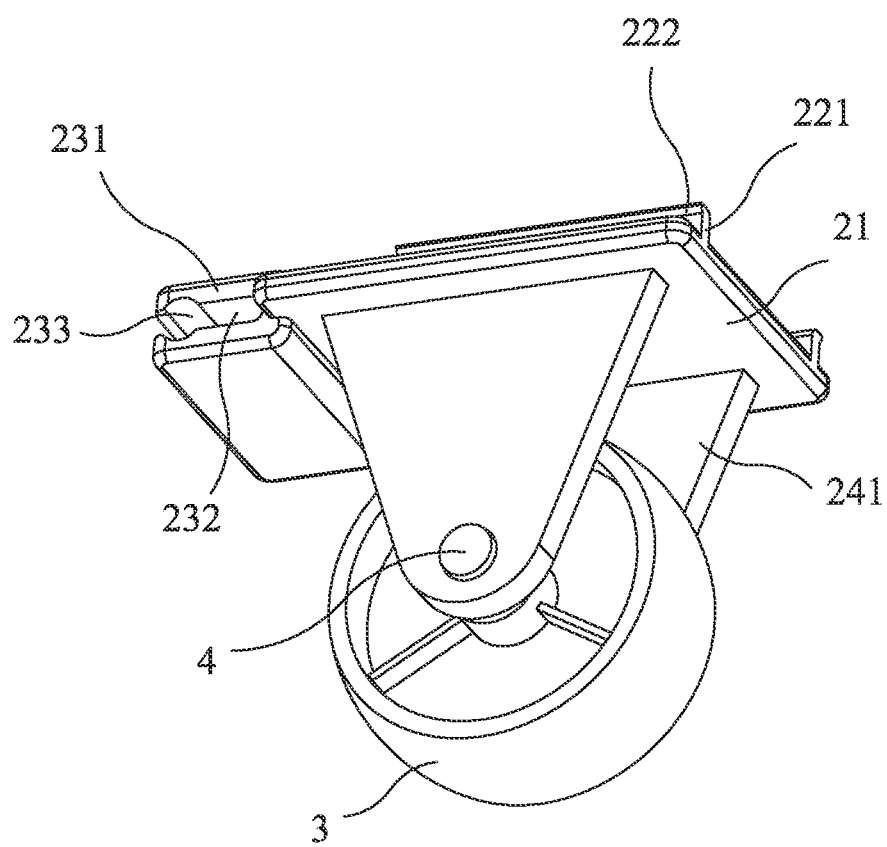
FIG. 6 is a second perspective view of the caster according to the embodiment of the present invention.
Figure 7:
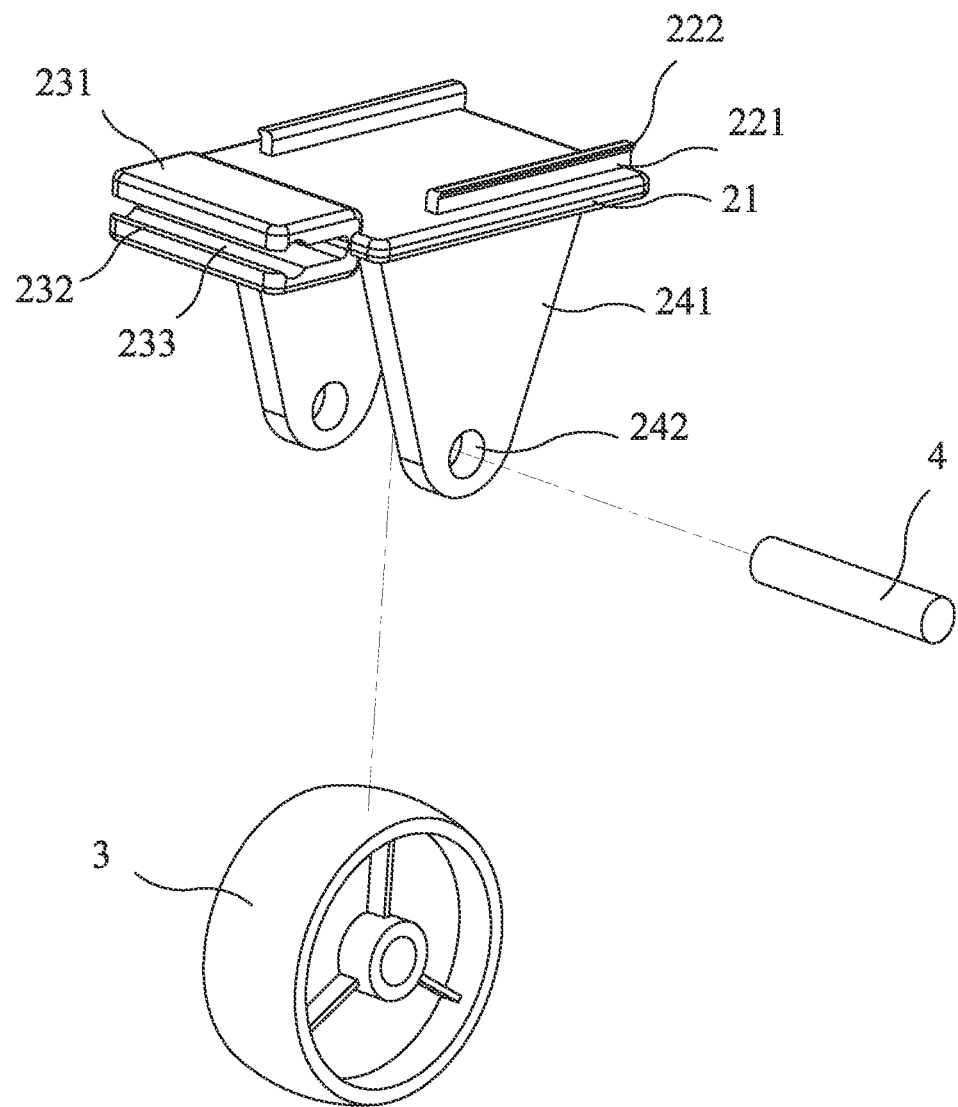
FIG. 7 is an exploded view of the caster according to the embodiment of the present invention.

Referring to FIGS. 1 to 7, the present invention discloses a movable container, comprising a frame 1 and a caster.

The underside 1A of the frame 1 is formed by a plurality of transverse rods 11 and longitudinal rods 12 that are perpendicularly connected to each other.

The caster is detachably mounted to the underside 1A of the frame 1. The caster includes a caster wheel bracket 2 and a caster wheel 3.

The caster wheel bracket 2 includes a support plate 21 for supporting the underside 1A of the frame 1. A first restricting portion 22 is disposed on the upper surface of the support plate 21. The first restricting portion 22 is detachably fitted to corresponding two of the transverse rods 11. A second restricting portion 23 is disposed on the end of the support plate 21. The second restricting portion 23 is detachably fitted to a corresponding one of the longitudinal rods 12. A mounting portion 24 is connected to the lower surface of the support plate 21.

The caster wheel 3 is rotatably connected to the mounting portion 24.

In some embodiments of the frame 1, the side 1B of the frame 1 is formed by a plurality of transverse rods 11/longitudinal rods 12 and vertical rods 13 that are perpendicularly connected to each other. The frame 1 includes the underside 1A and a plurality of sides 1B to surround a storage space for storing objects. The storage space may have a side opening (for example, the frame 1 has three sides 1B), so that the user can take and place objects in the storage space from the side opening. It is convenient for use.

In some embodiments of the caster wheel bracket 2, the first restricting portion 22 is a protruding structure formed on the upper surface of the support plate 21. The corresponding two transverse rods 11 of the underside 1A of the frame 1 are clamped on both sides of the first restricting portion 22 in a tight fit manner, so that the first restricting portion 22 is detachably connected to the transverse rods 11. The transverse rods 11 cooperate with the first restricting portion 22 to restrict the caster wheel bracket 2 in the direction perpendicular to the transverse rods 11 (i.e., the direction parallel to the longitudinal rods 12). The first restricting portion 22 (i.e., the caster wheel bracket 2) will not shake between the corresponding two transverse rods 11. The assembly of the caster wheel bracket 2 is more stable.

Further, the protruding structure includes two flanges 221 protruding from the upper surface of the support plate 21. The adjacent or non-adjacent two of the transverse rods 11 of the underside 1A of the frame 1 are in tight fit with the sides walls (the outer side walls in the figure) of the two flanges 221 respectively. In addition, the first restricting portion 22 may be a raised platform. The raised platform is insertedly fitted between two adjacent transverse rods 11 of the underside 1A of the frame 1. The first restricting portion 22 in the form of the flanges 221 has a larger elastic deformation space due to its less width, which has less labor and lower material costs in assembly. The first restricting portion 22 in the form of a raised platform has better strength and is less likely to be broken due to repeated disassembly and assembly.

Furthermore, when the first restricting portion 22 is in the form of two flanges 221, the upper edges of the side walls of the flanges 221 have restricting edges 222 for restricting the corresponding transverse rods 11. The restricting edges 222 extend laterally along the flanges 221. When the transverse rods 11 are in tight fit with to the side walls of the flanges 221, the restricting edges 222 can restrict the transverse rods 11 in the direction perpendicular to the support plate 21. After the caster wheel bracket 2 is mounted to the frame 1, the direction perpendicular to the support plate 21 is more firm.

In some embodiments of the caster wheel bracket 2, the second restricting portion 23 is in the form of a clip formed at the end of the support plate 21. The clip is configured to clamp the corresponding longitudinal rod 12 of the underside 1A of the frame 1 to achieve a detachable connection. The longitudinal rod 12 cooperates with the second restricting portion 23 to restrict the caster wheel bracket 2 in the direction perpendicular to the longitudinal rod 12 (that is, the direction parallel to the transverse rods 11). The second restricting portion 23 (i.e., the caster wheel bracket 2) will not move relative to the longitudinal rod 12, so that the caster wheel bracket 2 and the longitudinal rod 12 of the frame 1 are relatively positioned.

Further, the clip includes two upper and lower clip plates 231, a clip opening 232 defined between the two clip plates 231 for receiving the corresponding longitudinal rod 12, and arc-shaped restricting grooves 233 on the upper and lower surfaces of the clip opening 232. The corresponding longitudinal rod 12 is movably fitted in the restricting grooves 233. In assembly, the longitudinal rod 12 is pushed in the clip opening 232 between the two clip plates 231, so that the clip plates 231 are opened and deformed and the longitudinal rod 12 is engaged in the restricting grooves 233.

In some embodiments of the caster wheel bracket 2, the mounting portion 24 includes two mounting plates 241 vertically connected to the lower surface of the support plate 21. The caster wheel 3 is rotatably connected between the lower ends of the two mounting plates 241. That is, the lower ends of the two mounting plates 241 have axle holes 242, and an axle 4 of the caster wheel 3 is inserted through the caster wheel 3 and secured in the axle holes 242. The axle 4 may be secured in the axle holes 242 by riveting, that is, a rivet is used as the axle 4 for mounting the caster wheel 3.

In addition, the mounting portion 24 may be in the form of a seat (that is, the two mounting plates 241 are integrated into one), and then an axle 4 or an axle portion for mounting the caster wheel 3 is disposed at the lower end thereof so that the caster wheel 3 may be mounted to one side or both sides of the mounting portion 24.

In some embodiments of the caster wheel bracket 2, the caster wheel bracket 2 is made of a nylon material, which not only meets the use strength of the caster but also saves the production cost.

With the above solutions, in the present invention, the first restricting portion 22 and the second restricting portion 23 of the caster wheel bracket 2 are in tight fit with the transverse rods 11 and the longitudinal rod 12 of the underside 1A of the frame 1, respectively. The caster wheel bracket 2 can be secured to the frame 1 without using other tools. The disassembly and assembly is fast and easy. Since the underside 1A of the frame 1 is composed of a plurality of transverse rods 11 and longitudinal rods 12, the caster wheel bracket 2 can be mounted at any position of the underside 1A of the frame 1 as required. The mounting position is more flexible. The support plate 21 of the caster wheel bracket 2 plays a support role for the frame 1. After an object is placed in the movable container, the stress is shared by the support plate 21 with a plurality of casters to ensure the load-bearing performance of the movable container.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A caster wheel bracket, detachably mounted to an underside of a frame, the underside of the frame being formed by a plurality of transverse rods and longitudinal rods that are perpendicularly connected to each other;
the caster wheel bracket including a support plate for supporting the underside of the frame; a first restricting portion being disposed on an upper surface of the support plate, the first restricting portion being detachably fitted to corresponding two of the transverse rods, a second restricting portion being disposed on one end of the support plate, the second restricting portion being detachably fitted to a corresponding one of the longitudinal rods, a mounting portion being connected to a lower surface of the support plate for mounting a caster wheel;
the first restricting portion is a protruding structure formed on the upper surface of the support plate, the corresponding two transverse rods of the underside of the frame are clamped on both sides of the first restricting portion in a tight fit manner.

2. The caster wheel bracket as claimed in claim 1, wherein the protruding structure includes two flanges protruding from the upper surface of the support plate, and the corresponding two transverse rods of the underside of the frame are adjacent or non-adjacent two of the transverse rods and are in tight fit with respective side walls of the two flanges.

3. The caster wheel bracket as claimed in claim 2, wherein upper edges of the side walls of the flanges each have restricting edges for restricting the corresponding two transverse rods, and the restricting edges extend laterally along the flanges.

4. The caster wheel bracket as claimed in claim 1, wherein the second restricting portion is in the form of a clip formed at the end of the support plate, and the clip is configured to clamp the corresponding longitudinal rod.

5. The caster wheel bracket as claimed in claim 4, wherein the clip includes two upper and lower clip plates, a clip opening defined between the two clip plates for receiving the corresponding longitudinal rod and arc-shaped restricting grooves on upper and lower surfaces of the clip opening, and the corresponding longitudinal rod is movably fitted in the restricting grooves.

6. The caster wheel bracket as claimed in claim 1, wherein the mounting portion includes two mounting plates vertically connected to the lower surface of the support plate.

7. The caster wheel bracket as claimed in claim 1, wherein the caster wheel bracket is made of a nylon material.

8. A caster, comprising the caster wheel bracket as claimed in claim 1 and a caster wheel; the caster wheel being rotatably connected to the mounting portion;
the first restricting portion is a protruding structure formed on the upper surface of the support plate, the corresponding two transverse rods of the underside of the frame are clamped on both sides of the first restricting portion in a tight fit manner.

9. The caster as claimed in claim 8, wherein the protruding structure includes two flanges protruding from the upper surface of the support plate, and the corresponding two transverse rods of the underside of the frame are adjacent or non-adjacent two of the transverse rods and are in tight fit with respective side walls of the two flanges.

10. The caster as claimed in claim 9, wherein upper edges of the side walls of the flanges each have restricting edges for restricting the corresponding two transverse rods, and the restricting edges extend laterally along the flanges.

11. The caster as claimed in claim 8, wherein the second restricting portion is in the form of a clip formed at the end of the support plate, and the clip is configured to clamp the corresponding longitudinal rod.

12. The caster as claimed in claim 11, wherein the clip includes two upper and lower clip plates, a clip opening defined between the two clip plates for receiving the corresponding longitudinal rod and arc-shaped restricting grooves on upper and lower surfaces of the clip opening, and the corresponding longitudinal rod is movably fitted in the restricting grooves.

13. A movable container, comprising the caster wheel bracket as claimed in claim 1, a frame and a caster wheel; the underside of the frame being formed by the plurality of transverse rods and longitudinal rods that are perpendicularly connected to each other, the first restricting portion being detachably fitted to corresponding two of the transverse rods, the second restricting portion being detachably fitted to a corresponding one of the longitudinal rods; the caster wheel being rotatably connected to the mounting portion.

14. The movable container as claimed in claim 13, wherein the frame includes the underside and a plurality of sides to surround a storage space therein, and each of the sides of the frame is formed by the plurality of transverse rods/longitudinal rods and vertical rods that are perpendicularly connected to each other.

15. The movable container as claimed in claim 13, wherein the first restricting portion is a protruding structure formed on the upper surface of the support plate, the corresponding two transverse rods of the underside of the frame are clamped on both sides of the first restricting portion in a tight fit manner.

16. The movable container as claimed in claim 15, wherein the protruding structure includes two flanges protruding from the upper surface of the support plate, and the corresponding two transverse rods of the underside of the frame are adjacent or non-adjacent two of the transverse rods and are in tight fit with respective side walls of the two flanges.

17. The movable container as claimed in claim 16, wherein upper edges of the side walls of the flanges each have restricting edges for restricting the corresponding two transverse rods, and the restricting edges extend laterally along the flanges.

18. The movable container as claimed in claim 13, wherein the second restricting portion is in the form of a clip formed at the end of the support plate, the clip is configured to clamp the corresponding longitudinal rod; the clip includes two upper and lower clip plates, a clip opening defined between the two clip plates for receiving the corresponding longitudinal rod and arc-shaped restricting grooves on upper and lower surfaces of the clip opening, and the corresponding longitudinal rod is movably fitted in the restricting grooves.

* * * * *